US007946051B1

(12) United States Patent
Hannah et al.

(10) Patent No.: US 7,946,051 B1
(45) Date of Patent: May 24, 2011

(54) HANDS FREE WALL MARKING DEVICE

(75) Inventors: Gary Ray Hannah, Shawnee, KS (US); Richard William Heim, Shawnee, KS (US)

(73) Assignees: Richard W. Heim, Shawnee, KS (US); Gary R. Hannah, Shawnee, KS (US)

( * ) Notice: Subject to any disclaimer, the term of this patent is extended or adjusted under 35 U.S.C. 154(b) by 137 days.

(21) Appl. No.: 12/135,193

(22) Filed: Jun. 8, 2008

Related U.S. Application Data

(60) Provisional application No. 60/943,039, filed on Jun. 9, 2007.

(51) Int. Cl.
*G01D 21/00* (2006.01)

(52) U.S. Cl. ........................................... 33/613; 33/528

(58) Field of Classification Search .................... 33/613, 33/644–645, 677, 679, 328
See application file for complete search history.

(56) References Cited

U.S. PATENT DOCUMENTS 4,220,309 A * 9/1980 Eisen et al. .................. 248/542
5,398,906 A 3/1995 Aydelott
5,867,917 A 2/1999 Karon
6,286,803 B1 * 9/2001 Pellino et al. ................ 248/490
6,421,928 B1 * 7/2002 Miller ............................ 33/520
6,470,585 B2 * 10/2002 Barr .............................. 33/528
6,952,887 B2 10/2005 Muchnik
6,971,184 B2 12/2005 Prevost
6,978,551 B2 * 12/2005 Krake et al. .................... 33/613
7,185,442 B2 3/2007 Grillo
7,334,342 B1 * 2/2008 Barr et al. ...................... 33/528

* cited by examiner

*Primary Examiner* — G. Bradley Bennett
*Assistant Examiner* — Tania C Courson

(57) ABSTRACT

A wall marking device for use in marking where to install a support element such as a nail for hanging objects such as pictures and minors. The device is simple to use and manufacture, having very few components and can be used in one configuration with most common hanger hardware such as wire, saw tooth hangers, hole/slots, and D-rings.

15 Claims, 11 Drawing Sheets

HANDS FREE WALL MARKING DEVICE

CROSS-REFERENCE TO RELATED APPLICATIONS

This application claims benefit of provisional patent application Ser. No. 60/943,039 filed 2007 Jun. 9 by the present inventors.

FEDERALLY SPONSORED RESEARCH

Not Applicable

SEQUENCE LISTING OR PROGRAM

Not Applicable

BACKGROUND

1. Field of Invention

This invention relates to picture hanger locating devices and more particularly to devices for marking the location on a wall for installation of a support for hanging an article such as a picture.

2. Prior Art

Objects intended to be displayed on a wall, such as pictures and minors, are typically hung on a nail in a wall with hanger hardware. Hanger hardware, such as a wire, hole/slot, D-ring, or saw-tooth, are attached to the back side of the object. The problem is locating where to install the nail on the wall so that when the picture is hung on the nail the picture is in the desired location. It is difficult to determine where on the wall to install the nail because the hanger hardware is on the back of the picture and not visible when deciding where to place the picture. Various devices have been conceived for marking the wall in the exact location where a nail should be positioned, but these devices all have serious issues that prevent them from being widely adopted. Aydelotte discloses a wall marking device in U.S. Pat. No. 5,398,906 which requires various configurations to accommodate the different hanger hardware commonly attached to pictures, such as wire, saw-tooth, D-Rings, and hole/slots. One such configuration requires several components including a spring. This complexity causes confusion and increases the cost of manufacturing. Other disclosures, such as Karon in U.S. Pat. No. 5,867,917, Muchnik in U.S. Pat. No. 6,952,887, and Prevost in U.S. Pat. No. 6,971,184, are highly complex and expensive to manufacture. In addition, U.S. Pat. No. 6,952,887 cannot be used on wire support hardware. Grillo disclosed a wall marking device in U.S. Pat. No. 7,185,442 that includes a target patch that sticks to the wall, marking the nail location. The target patch is not reusable, requiring the user to continuously purchase additional target patches. What all of the current art lacks is a wall marking device that is easy to use on all common hanger hardware, is simple in design, and low in cost to manufacture.

SUMMARY

The present invention provides a device for marking a wall or other surface when mounting picture frames, shelves, mirrors, or other objects. The device uses a protrusion to engage hanger hardware on the back side of an object to be mounted. A hinge allows the device to rotate so that a reusable adhesive patch can temporarily attach the device to the back of the object to be mounted. A marking member is located opposite of the protrusion accurately locating the device's marking member where a nail type fastener should be located on the wall. Once the wall marking device is in position on the object to be mounted, the user positions the object in the desired location on a wall and simply applies pressure to the object. The marking member produces a mark on the wall surface. When not in use the device is folded up using the hinge, protecting the tacky adhesive from getting soiled. The device has areas for advertising.

DRAWINGS

Figures

REFERENCE NUMERALS

Figure 1:
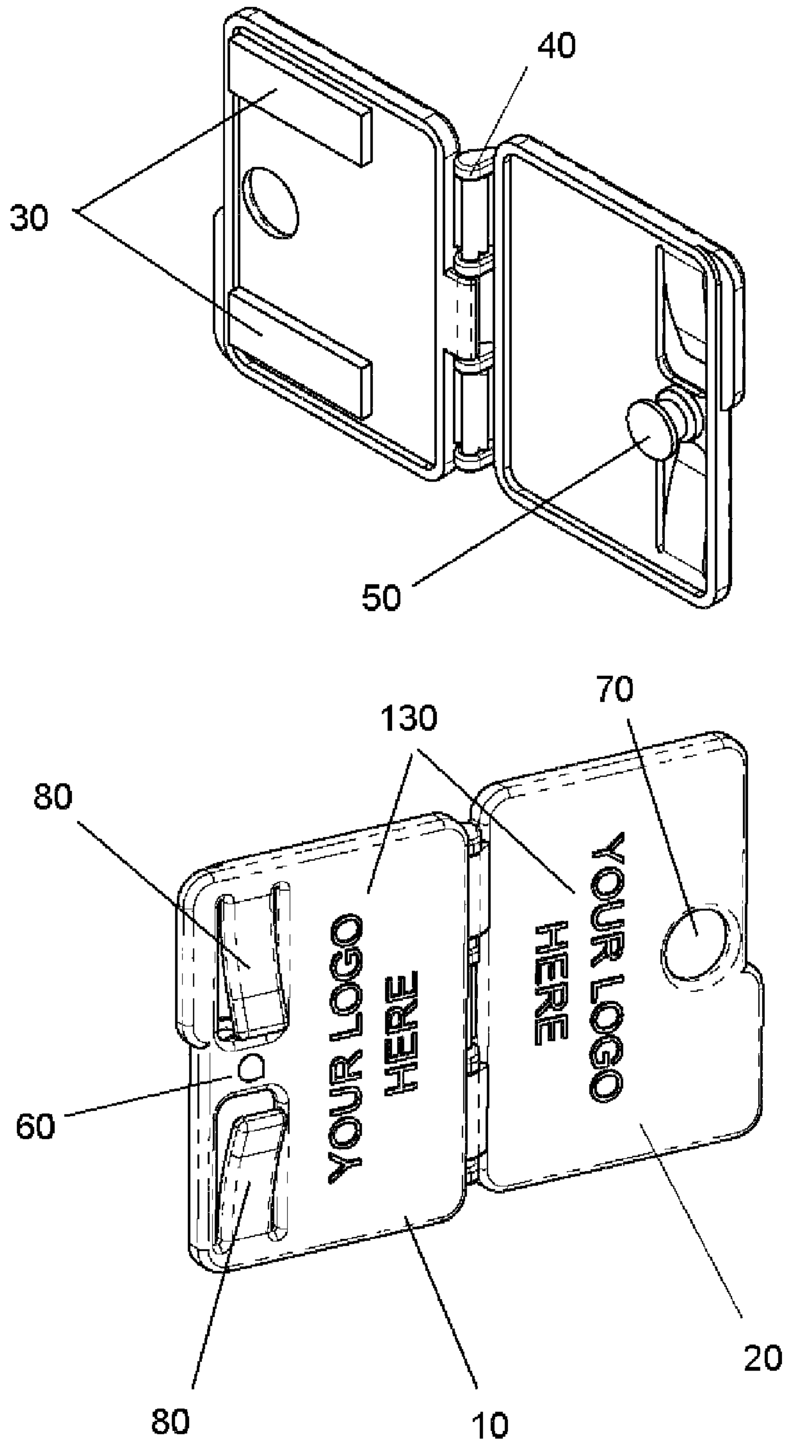
FIG. 1 shows the marking device in the open position.
Figure 2:
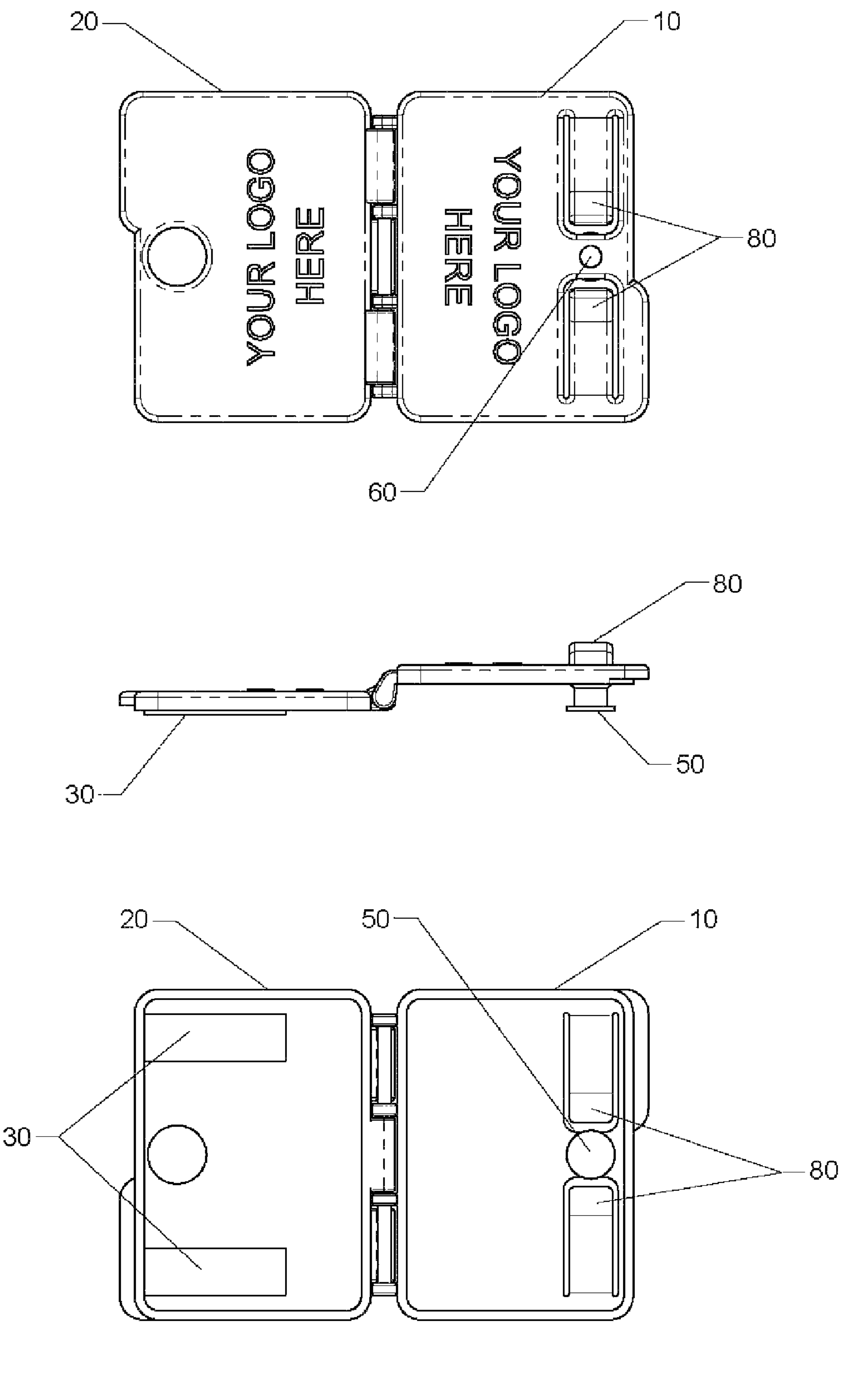
FIG. 2 shows another view of the marking device in the open position.

1 wall marking device
10 bottom plate
20 top plate
30 reusable adhesive patch
40 hinge
50 protrusion
60 marking member
70 window
80 spring tabs
90 picture frame
110 wire
120 saw-tooth hanger hardware
130 advertising space
140 hole/slot
150 base
160 D-ring
170 compressible pad

DETAILED DESCRIPTION

The present invention provides a device for marking a wall or other surface when mounting picture frames, shelves, mirrors, or other wall mounted objects.

A first embodiment is comprised of two plates hinged together. Referring to FIG. 1, the bottom plate 10 incorporates protrusion 50, advertising space 130, hinge 40, spring tabs 80, and marking member 60. Referring again to FIG. 1, top plate 20 incorporates window 70, hinge 40, and has reusable adhesive patches 30 affixed. Reusable adhesive patches 30 are made from a tacky reusable adhesive such as silicone. Hinge 40 attaches bottom plate 10 to top plate 20 and can be a two part hinge or a single part "living hinge". Protrusion 50 is attached to bottom plate 10 on the opposite side as spring tabs 80. Marking member 60 is attached to bottom plate 10, opposite of protrusion 50. Window 70 is in top plate 20. Spring tabs 80 are integrated into the bottom plate 10 on either side of marking member 60. Advertising space 130 is located on both bottom plate 10 and top plate 20.

A second embodiment comprises a base 150 made of a flexible plastic, a marking member 60, reusable adhesive patches 30, and a protrusion 50. Reusable adhesive patch 30 is made from a reusable adhesive such as silicone. Protrusion 50 is attached to base 150 on the same side as reusable patches 30. Marking member 60 is also attached to base 150 on the opposite side from protrusion 50.

Figure 5:
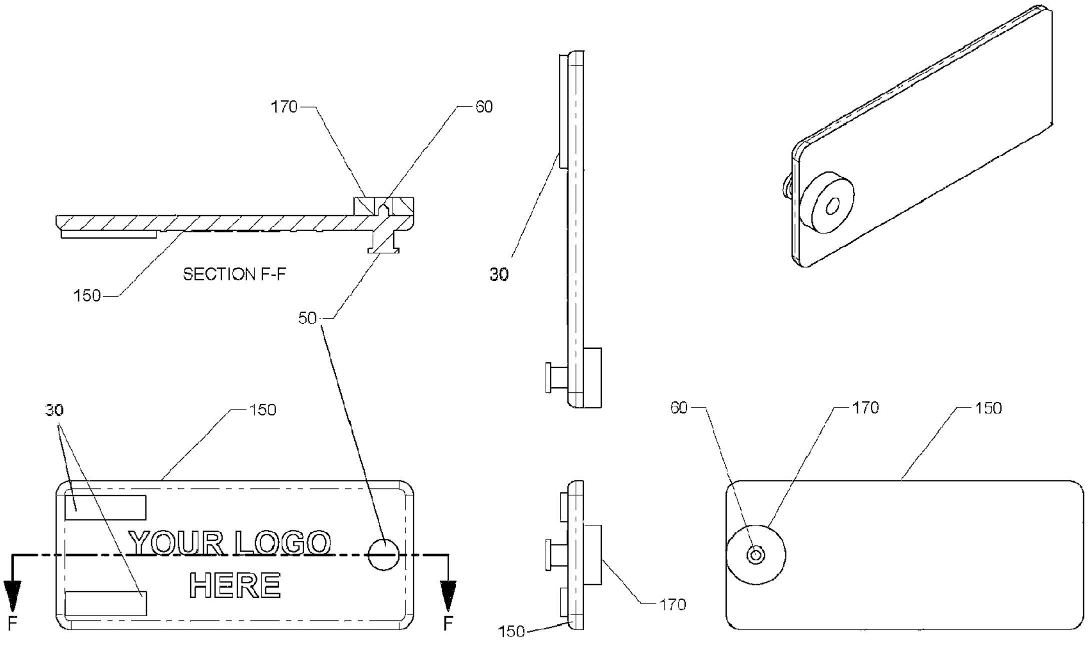
FIG. 5 shows the marking device without a hinge and with a compressible pad.

A third embodiment, shown in FIG. 5, comprises a base 150 made of a flexible plastic, a marking member 60, reusable adhesive patches 30, protrusion 50 and compressible pad 170. Reusable adhesive patches 30 are made from a tacky adhesive such as silicone. Protrusion 50 is attached to base 150 on the same side as reusable patches 30. Marking member 60 is also attached to base 150 on the opposite side as protrusion 50. Compressible pad 170 covers or surrounds marking member 60 to prevent it from marking a wall until it is compressed.

Operation of First Embodiment

Figure 3:
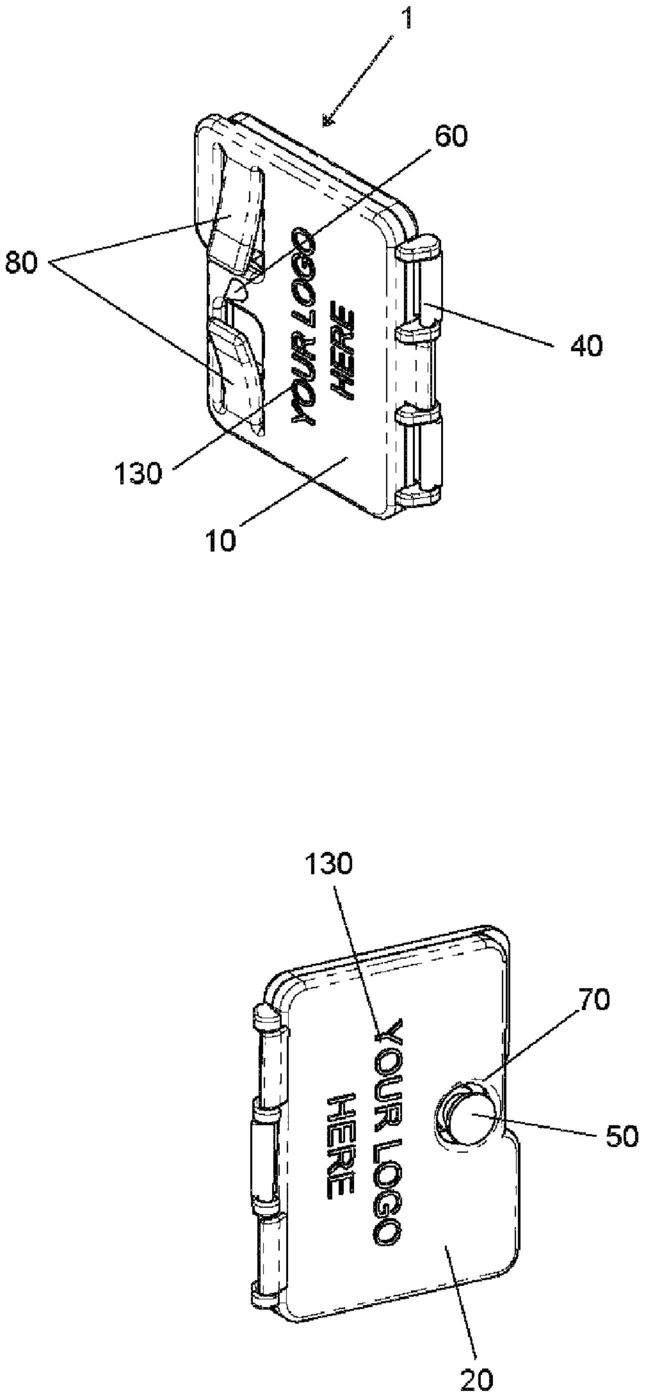
FIG. 3 shows the marking device in the closed position.
Figure 4:
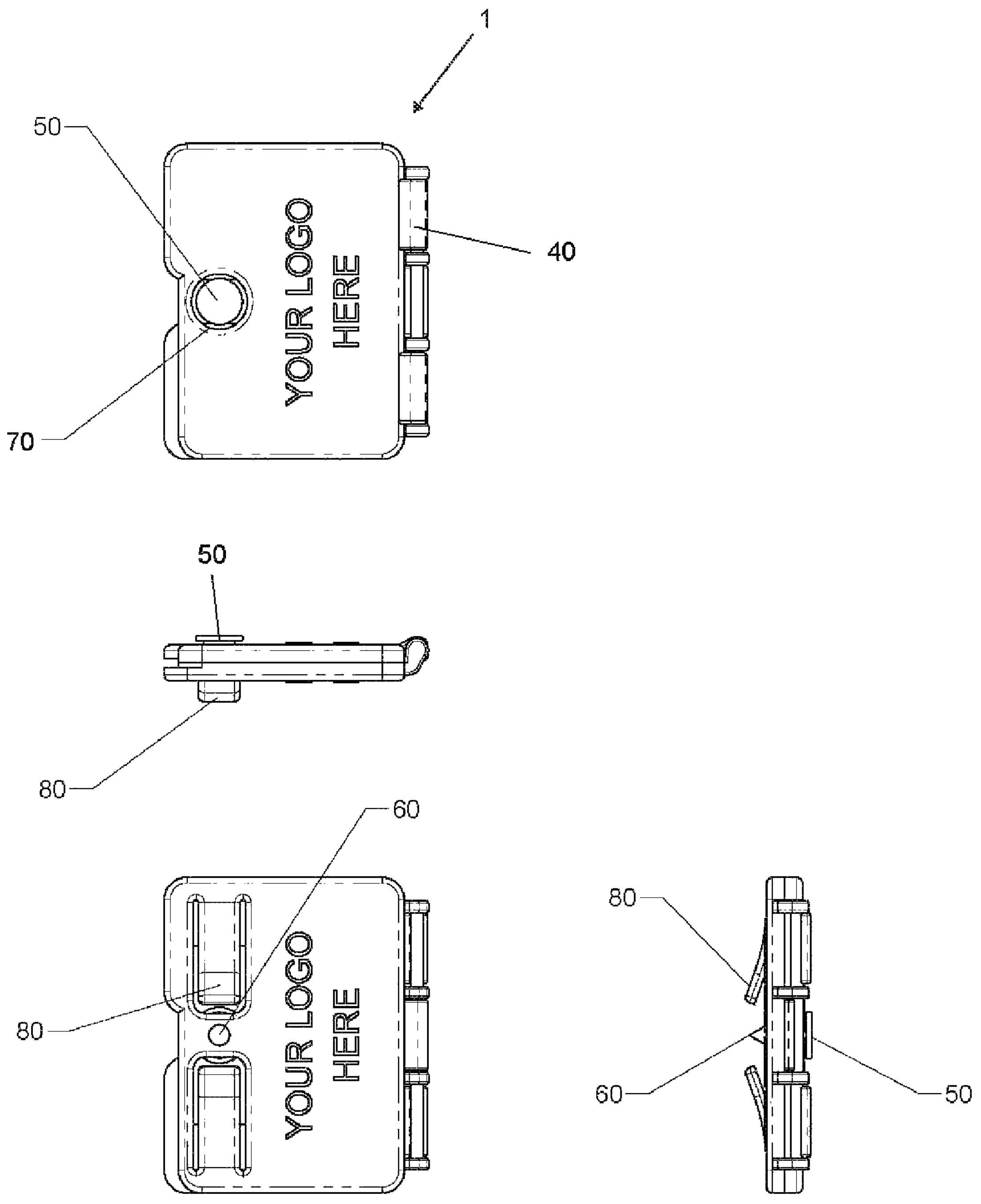
FIG. 4 shows another view of the marking device in the closed position.
Figure 6:
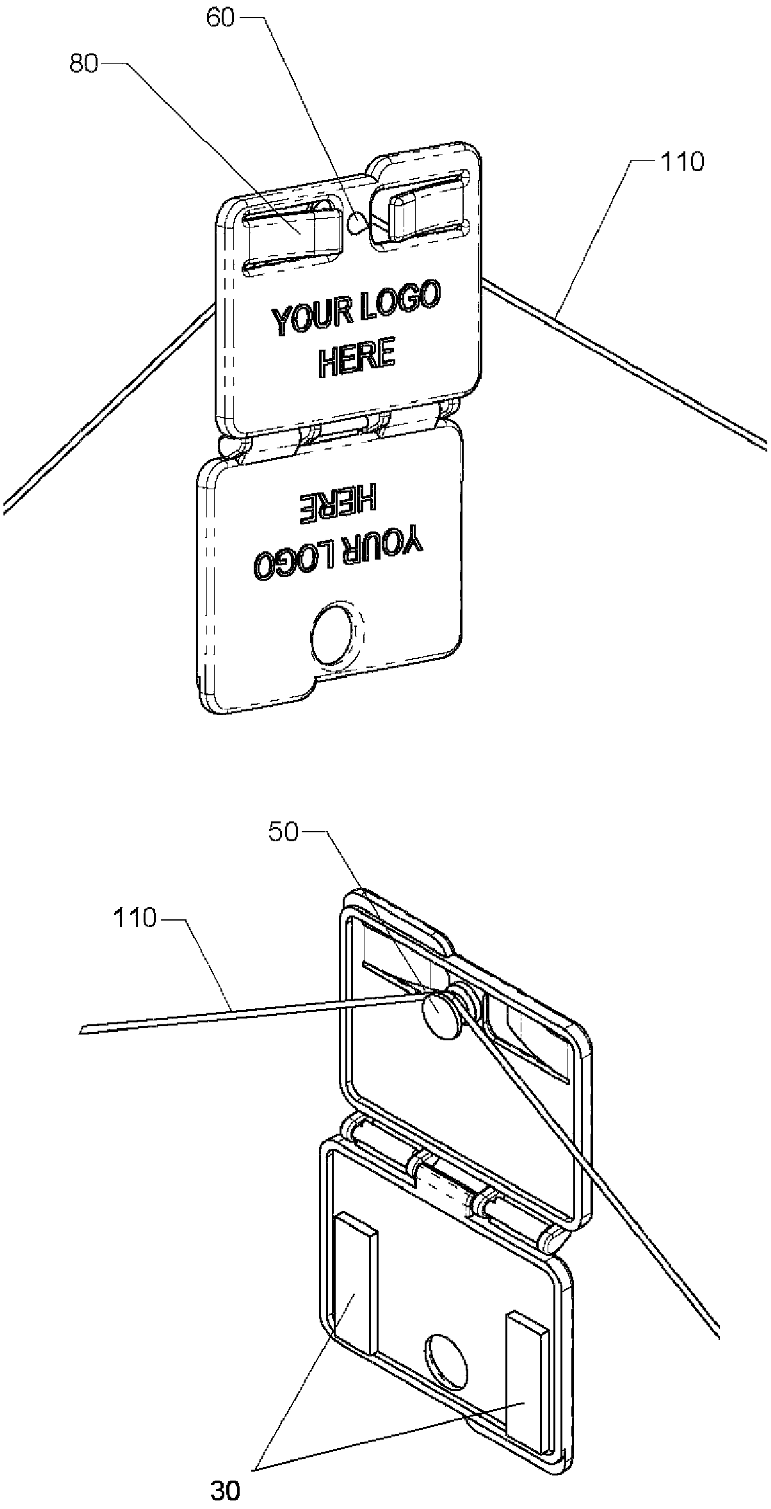
FIG. 6 shows the marking device being attached to wire hanger hardware.
Figure 7:
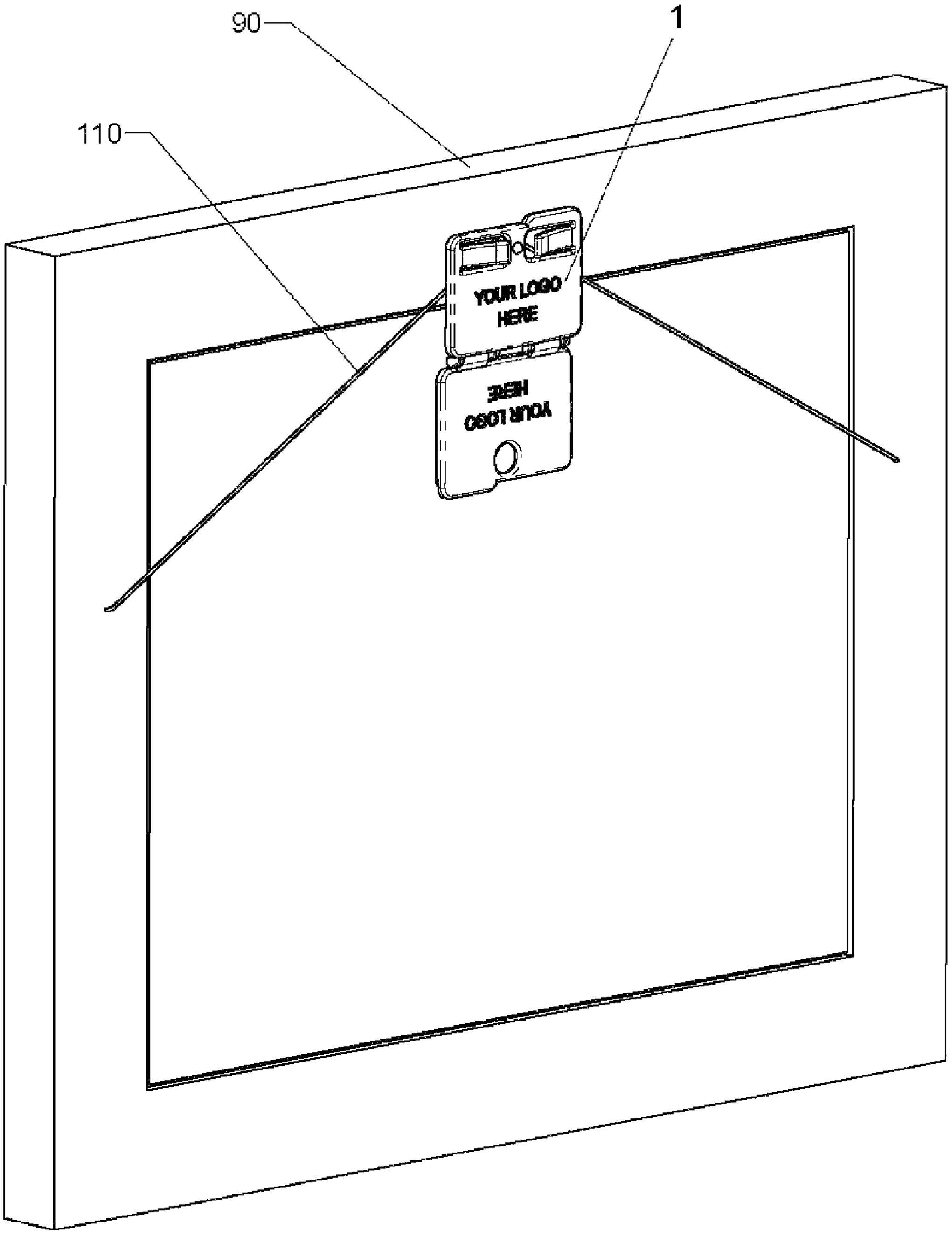
FIG. 7 shows the marking device attached to a frame with wire hanger hardware.

When mounting objects with wire hanger hardware, such as a picture frame, the user opens the wall marking device as shown in FIG. 6. As illustrated in FIGS. 6 and 7, the user pulls the wire 110 taught and engages protrusion 50 with wire 110 having marking member 60 facing away from picture frame 90. With protrusion 50 engaged and keeping wire 110 taught, the user presses reusable adhesive patches 30 against the object to be mounted. Now the wall marking device is secured in place on the object to be mounted as shown in FIG. 7. The user positions the object to be mounted in the desired mounting location on the wall. As the user adjusts the location of the object on the wall, spring tabs 80 protect the wall from being scratched or marked by marking member 60. This is due to the spring tabs 80 contacting the wall before marking member 60 when the spring tabs 80 are in an un-deflected state. Once the object is in the desired location on the wall, the user simply presses the object against the wall. Spring tabs 80 deflect in towards the marking member 60 allowing the marking member 60 to make a small indentation on the wall, marking the exact location where a nail type support element should be placed. The user now removes the marking device by peeling the reusable adhesive patches 30 from the object to be mounted and disengaging protrusion 50 from picture wire 110. The wall marking device can now be closed by rotating the bottom plate 10 and top plate 20 together about hinge 40 with reusable adhesive patches 30 in between as shown in FIG. 3 and FIG. 4. Protrusion 50 passes through window 70 allowing bottom plate 10 and top plate 20 to fully close over reusable adhesive patches 30. Now reusable adhesive patches 30 are protected from being soiled and advertising spaces 130 are fully visible. The wall marking device can be stored for reuse.

Figure 8:
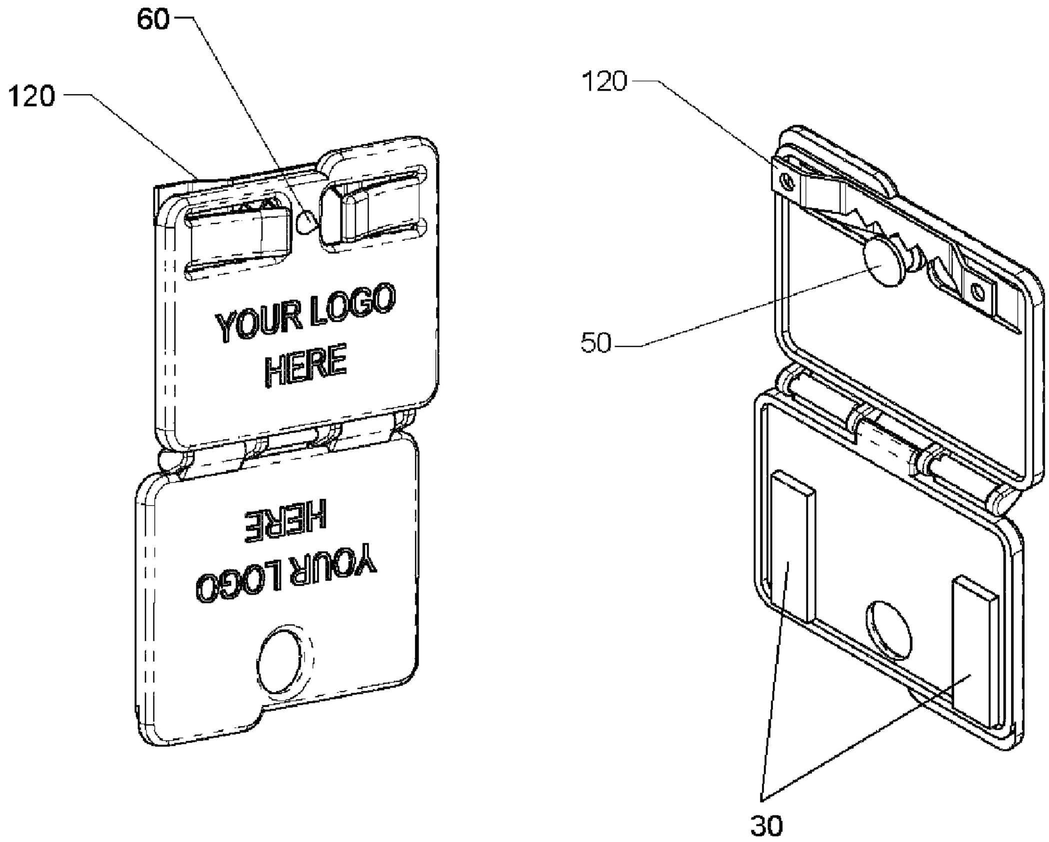
FIG. 8 shows the marking device being attached to saw-tooth hanger hardware.
Figure 9:
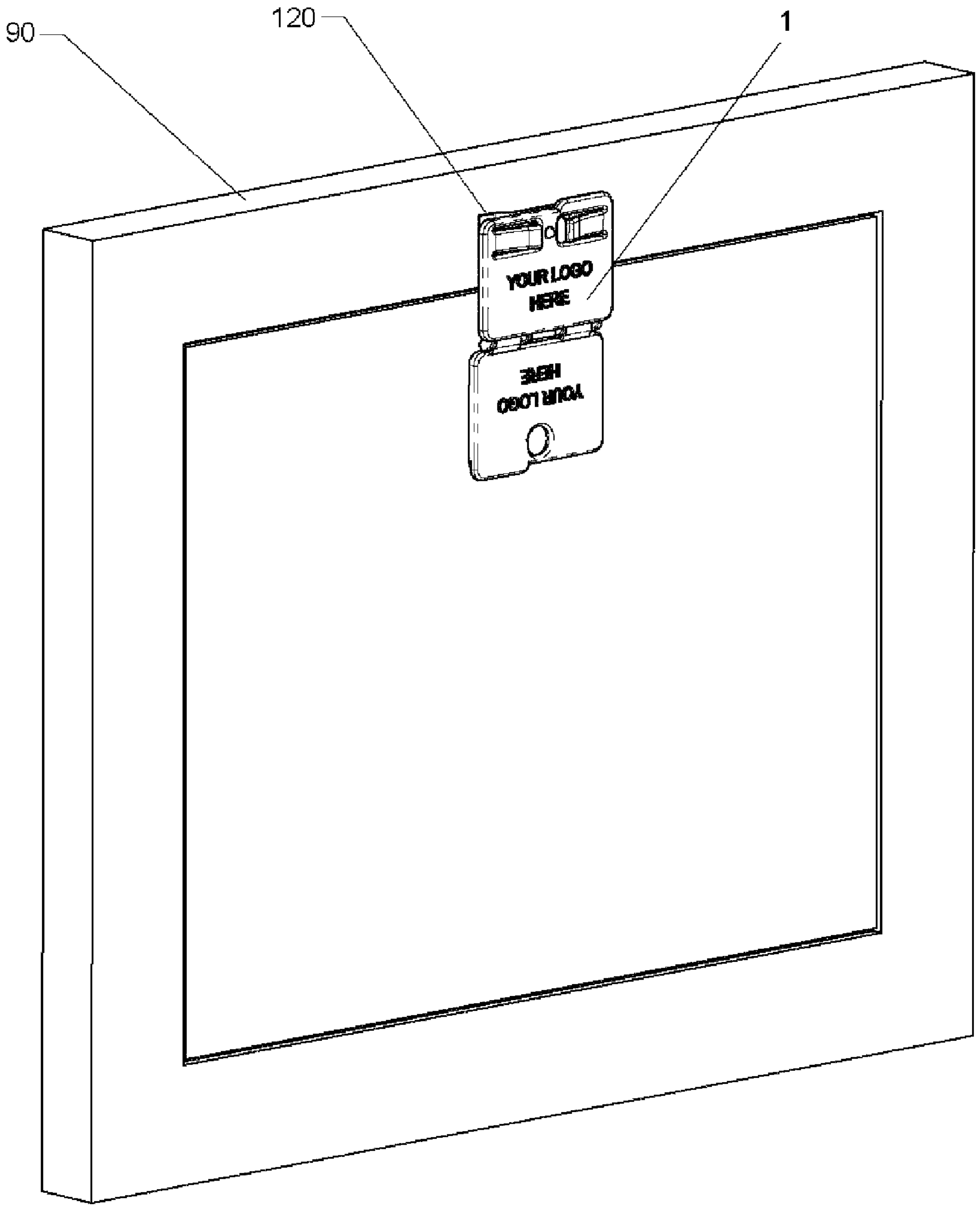
FIG. 9 shows the marking device attached to a frame with saw-tooth hanger hardware.

When mounting objects with saw-tooth type hanger hardware, such as a picture frame, the user opens the wall marking device as shown in FIG. 8. The user engages protrusion 50 with saw-tooth hanger hardware 120 having marking member 60 facing away from picture frame 90 as shown in FIG. 8 and FIG. 9. With protrusion 50 engaged with saw-tooth hanger hardware 120, the user presses reusable adhesive patches 30 against the object to be mounted as shown in FIG. 9. Now the wall marking device is secured in place on the object to be mounted. Two wall marking devices can be affixed as described above if there are two saw-tooth hanger hardware 120 present on the object to be mounted. The user places the object to be mounted in the desired mounting location on the wall. As the user adjusts the position of the object on the wall, spring tabs 80 protect the wall from being scratched or marked by marking member 60. This is due to spring tabs 80 contacting the wall before marking member 60 when spring tabs 80 are in an un-deflected state. Once the object is in the desired location on the wall, the user simply presses the object against the wall. Spring tabs 80 deflect in towards marking member 60 allowing the marking member 60 to make a small indentation on the wall, marking the exact location where a nail type support element should be placed. If two wall marking devices were used there will be two indentations in the wall. The user now removes the marking device by peeling the reusable adhesive patches 30 from the object to be mounted and disengaging protrusion 50 from saw-tooth hanger hardware 120. The wall marking device can now be closed by rotating the bottom plate 10 and top plate 20 together about hinge 40 with reusable adhesive patches 30 in between as shown in FIG. 3 and FIG. 4. Protrusion 50 passes through window 70 allowing bottom plate 10 and top plate 20 to fully close over reusable adhesive patches 30. Now reusable adhesive patches 30 are protected from being soiled and advertising spaces 130 are fully visible. The wall marking device can be stored for reuse.

Figure 10:
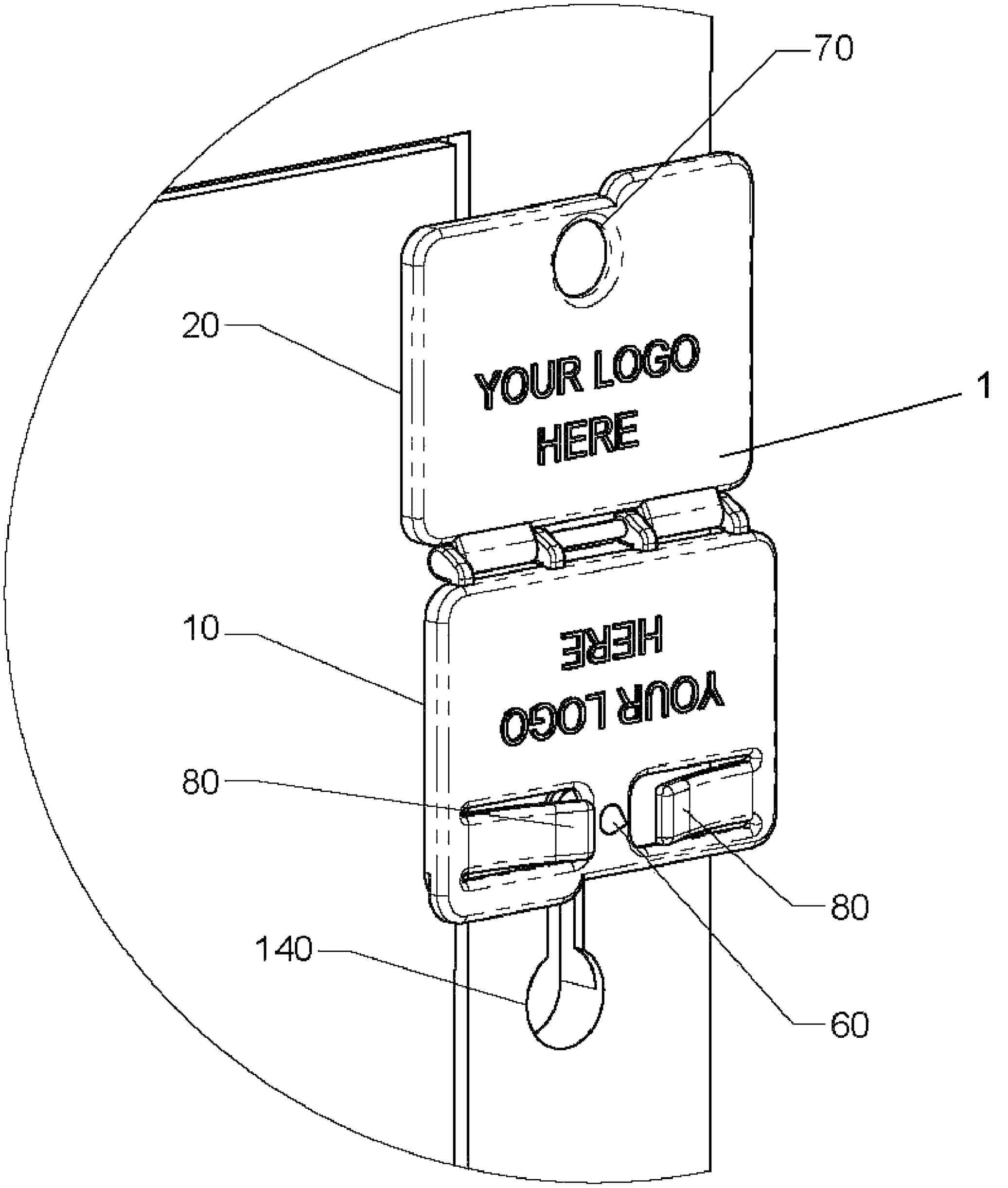
FIG. 10 shows the marking device attached to a frame with a hole/slot.
Figure 11:
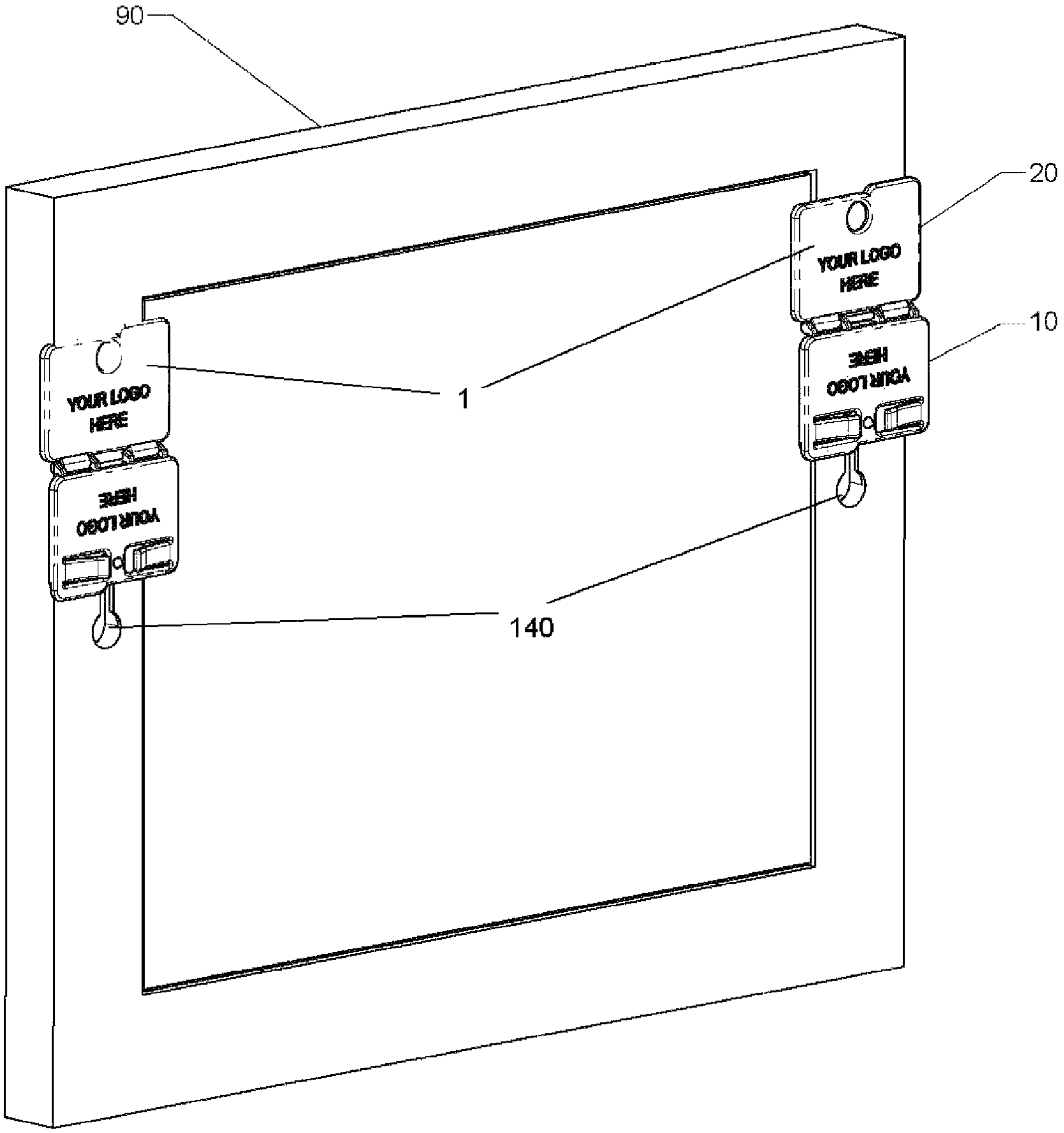
FIG. 11 shows two marking devices being used on a frame with two hole/slots.

When mounting objects with a hole/slot 140, such as a picture frame, the user opens the wall marking device as shown in FIG. 10. As illustrated in FIG. 10 and FIG. 11, the user inserts protrusion 50 into the hole/slot 140 of the object to be mounted with the marking member 60 facing away from the object to be mounted. With protrusion 50 inserted into the hole/slot 140, the user presses reusable adhesive patches 30 against the object to be mounted. Now the wall marking device is secured in place on the object to be mounted. Two wall marking devices can be affixed as described above if there are two holes/slots 140 on the object to be mounted as shown in FIG. 11. The user places the object to be mounted in the desired mounting location on the wall. As the user adjusts the location of the object on the wall, spring tabs 80 protect the wall from being scratched or marked by marking member 60. This is due to spring tabs 80 contacting the wall before marking member 60 when spring tabs 80 are in an un-deflected state. Once the object is in the desired location on the wall, the user simply presses the object against the wall. Spring tabs 80 deflect in towards marking member 60 allowing marking member 60 to make a small indentation on the wall, marking the exact location where a nail type support element should be placed. If two wall marking devices were used there will be two indentations in the wall. The user now removes the marking device by peeling reusable adhesive patches 30 from the object to be mounted and removing protrusion 50 from the hole/slot 140. The wall marking device can now be closed by rotating the bottom plate 10 and top plate 20 together about hinge 40 with reusable adhesive patches 30 in between as shown in FIG. 3 and FIG. 4. Protrusion 50 passes through window 70 allowing bottom plate 10 and top plate 20 to fully close over reusable adhesive patches 30. Now reusable adhesive patches 30 are protected from being soiled and advertising spaces 130 are fully visible. The wall marking device can be stored for reuse.

When mounting objects with D-ring type hanger hardware, such as a picture frame, the wall marking device is used in the same way as described above. Protrusion 50 is engaged with the D-ring hanger hardware of the object to be mounted with marking member 60 facing away from the object to be mounted. With protrusion 50 still engaged with the D-ring, the user presses reusable adhesive patches 30 against the object to be mounted. Now the wall marking device is secured in place on the object to be mounted. Two wall marking devices can be affixed as described above if there are two D-rings on the object to be mounted. The user places the object to be mounted in the desired mounting location on the wall. As the user adjusts the position of the object on the wall, spring tabs 80 protect the wall from being scratched or marked by marking member 60. This is due to spring tabs 80 contacting the wall before marking member 60 when spring tabs 80 are in the un-deflected state. Once the object is in the desired location on the wall, the user simply presses the object against the wall. Spring tabs 80 deflect in towards the marking member 60 allowing the marking member 60 to make a small indentation on the wall, marking the exact location where a nail type support element should be placed. If two wall marking devices were used there will be two indentations in the wall. The user now removes the marking device by peeling the reusable adhesive patches 30 from the object to be mounted and disengaging protrusion 50 from the D-ring. The wall marking device can now be closed by rotating the bottom plate 10 and top plate 20 together about hinge 40 with reusable adhesive patches 30 in between as shown in FIG. 3 and FIG. 4. Protrusion 50 passes through window 70 allowing bottom plate 10 and top plate 20 to fully close over reusable adhesive patches 30. Now reusable adhesive patches 30 are protected from being soiled and advertising spaces 130 are fully visible. The wall marking device can be stored for reuse.

Operation of Second Embodiment

The second embodiment operates the same as the first embodiment, with the exception of opening and closing the wall marking device. The second embodiment does not have two halves hinged together, so it is always "open".

Operation of Third Embodiment

The third embodiment shown in FIG. 5 operates the same as the second embodiment with the exception of a compressible pad 170 being used instead of spring tabs 80. Compressible pad 170 prevents marking member 60 from marking the wall until the object to be mounted is pressed against the wall with the wall marking device attached. This causes compressible pad 170 to be compressed allowing the marking member 60 to mark the wall.

Advantages

From the description above, a number of advantages of some embodiments of our wall marking device become evident:

a) Simplicity of use. A reusable adhesive patch that allows the user to simply stick the wall marking device in position on the back of the object to be mounted. The current art has complex hardware that must be fastened to the object's hanger hardware.

b) A protrusion that easily positions the marking member with respect to the hanger hardware of an object to be mounted.

c) Only one configuration is needed for all common hanger hardware: Wire, saw-tooth, D-ring or hole/slot.

d) Does not require the purchase of expendable supplies. The adhesive patch is reusable. Other current art (U.S. Pat. No. 7,185,442 B2) requires the user to purchase expendable components.

e) Low cost to manufacture. The device has few components and each component is inexpensive to manufacture.

f) Ease of use. The user simply holds the object to be mounted against the wall in the desired location and presses it against the wall. The current art requires the object to be mounted to be held with a long rod or stick, which is quite awkward.

Description of Alternative Embodiments

Marking member 60 could be replaced with an ink marking member which makes an ink mark on the mounting surface rather than an indentation.

Reusable adhesive patch 30 could be replaced with various other adhesive materials.

Protrusion 50 could be a hook or other shape that can engage the various types of hanger hardware.

The wall marking device could be without spring tabs 80 and without compressible pad 170 and without hinge 40.

CONCLUSION, RAMIFICATIONS, AND SCOPE

The reader will see that, according to one embodiment of the invention, we have provided a wall marking device which is simple to use and manufacture. The device can accommodate the most common hanger hardware used on pictures, minors, and other objects mounted on walls. While the above description contains many specificities, these should not be construed as limitations on the scope of any embodiment, but as exemplifications of the presently preferred embodiments thereof. Many other variations are possible within the teachings of the various embodiments. Thus the scope of the invention should be determined by the appended claims and their legal equivalents, and not by the examples given.

We claim:

1. A wall marking device, comprising:

(a) a base, (b) a marking member secured to said base and fixed in position relative to said base, (c) one or more reusable adhesive patches secured to said base on side of said base opposite from said marking member, and (d) a protrusion secured to said base on side of base opposite from said marking member, said protrusion being positioned coaxial with said marking member, whereby said wall marking device can be temporarily attached to the back of an object to be mounted on a wall using said reusable adhesive patches allowing said object to be pressed against a wall causing said wall marking device to mark the wall location for a support element without holding said marking device.

2. The wall marking device of claim 1 further including a compressible pad which prevents said marking member from contacting a wall surface until said object to be mounted is pressed against the wall surface causing said compressible pad to be compressed allowing said marking member to contact the wall, making a mark.

3. The wall marking device of claim 1 further including one or more spring tabs on which, when un-deflected, prevent said marking member from contacting a wall surface until said object to be mounted is pressed against the wall surface deflecting said spring tabs and allowing said marking member to contact the wall, making a mark.

4. The wall marking device of claim 1 further including advertising space on the front and back sides of said base.

5. The wall marking device of claim 1 wherein said base is made of a flexible material whereby said base can be bent a required amount to engage said protrusion with said hanger hardware on said object to be mounted.

6. The wall marking device of claim 1 wherein said marking member has a pointed tip which marks the wall by creating an indentation in the wall surface.

7. The wall marking device of claim 1 wherein said marking member carries ink whereby an ink mark is made on the wall surface.

8. A wall marking device, comprising:

(a) a bottom plate, (b) a top plate, (c) said bottom plate being attached to said top plate by a hinge, (d) one or more reusable adhesive patches secured to said top plate, (e) a marking member secured to said bottom plate and (f) a protrusion secured to said bottom plate on side opposite from said marking member, said protrusion being positioned coaxial with said marking member, whereby said wall marking device can be temporarily attached to the back of an object to be mounted on a wall using said reusable adhesive patches allowing said object to be pressed against a wall causing said wall marking device to mark the wall location for a support element without holding said marking device and said top plate and said bottom plate close via said hinge thereby protecting said reusable adhesive patches from becoming soiled when said marking device is not in use.

9. The wall marking device of claim 8 further including a window in said top plate through which said protrusion passes when said wall marking device is in a closed position.

10. The wall marking device of claim 8 further including a compressible pad which prevents said marking member from contacting a wall surface until said object to be mounted is pressed against said wall surface causing said compressible pad to be compressed allowing said marking member to contact said wall, making a mark.

11. The wall marking device of claim 8 further including one or more spring tabs on said bottom plate which when un-deflected prevent said marking member from contacting a wall surface until said object to be mounted is pressed against the wall surface, deflecting said spring tabs and allowing said marking member to contact the wall, making a mark.

12. The wall marking device of claim 8 further including advertising space on said top plate and on said bottom plate.

13. The wall marking device of claim 8 wherein said marking member has a pointed tip which marks the wall by creating an indentation on the wall surface.

14. The wall marking device of claim 8 wherein said marking member carries ink whereby an ink mark is made on the wall surface.

15. A method for marking walls for mounting objects, comprising:

(a) providing a wall marking device comprising a marking member, one or more reusable adhesive patches, and a protrusion, (b) providing an object to be mounted on a wall, said object having hanger hardware secured to a back side, (c) engaging said protrusion with said hanger hardware, (d) affixing said wall marking device to the back side of said object by pressing said reusable adhesive patch against object, (e) pressing back side of said object with wall marking device affixed against a wall surface, (f) removing said object from wall surface which now has a mark for positioning a support element, (g) removing said wall marking device from said object, (h) installing support element, such as a nail, through said mark on wall surface and into said wall, and (i) hanging said object on said support hardware, whereby said wall marking device can be temporarily attached to the back of an object to be mounted on a wall using said reusable adhesive patches allowing said object to be pressed against a wall causing said wall marking device to mark the wall location for a support element without holding said marking device.

* * * * *